(12) United States Patent
Bertosh et al.

(10) Patent No.: US 11,388,571 B2
(45) Date of Patent: *Jul. 12, 2022

(54) METHOD AND APPARATUS FOR PROTECTING A MINER

(71) Applicants: Michael W. Bertosh, Roswell, GA (US); Michael Berube, Marietta, GA (US); Kelly Norton, Roswell, GA (US); Brian Dunkin, Boulder, CO (US)

(72) Inventors: Michael W. Bertosh, Roswell, GA (US); Michael Berube, Marietta, GA (US); Kelly Norton, Roswell, GA (US); Brian Dunkin, Boulder, CO (US)

(73) Assignee: Strata Products Worldwide, LLC, Sandy Springs, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/650,268

(22) Filed: Jul. 14, 2017

(65) Prior Publication Data
US 2017/0325052 A1    Nov. 9, 2017

Related U.S. Application Data

(60) Division of application No. 14/325,028, filed on Jul. 7, 2014, now Pat. No. 9,712,949, and a
(Continued)

(51) Int. Cl.
G08B 21/22    (2006.01)
G08B 21/02    (2006.01)
(Continued)

(52) U.S. Cl.
CPC .............. *H04W 4/80* (2018.02); *B60Q 9/008* (2013.01); *F16P 3/145* (2013.01); *G08B 21/02* (2013.01);
(Continued)

(58) Field of Classification Search
CPC .. B60Q 9/008; F16P 3/14; F16P 3/147; G08B 13/1427; G08B 21/0213; G08B 21/22;
(Continued)

(56) References Cited

U.S. PATENT DOCUMENTS 4,937,795 A * 6/1990 Motegi ................. A41D 13/00
340/539.1
5,198,800 A * 3/1993 Tozawa ................ E02F 9/2033
212/276

(Continued)

*Primary Examiner* — Hoi C Lau
(74) *Attorney, Agent, or Firm* — Ansel M. Schwartz

(57) ABSTRACT

An apparatus for protecting a miner from injury by a machine in a mine includes an explosion-proof housing. The apparatus includes a proximity sensing portion disposed in the explosion-proof housing having a magnetic field source which produces a magnetic field that is used to sense a location of the miner relative to the machine. The apparatus includes a wireless communication portion disposed in the explosion-proof housing through which the magnetic field produced by the magnetic field source is changed remotely and wirelessly from outside the explosion-proof housing. A method for protecting a miner from injury by a machine. A system for protecting a miner from injury by a machine in a mine.

18 Claims, 4 Drawing Sheets

Related U.S. Application Data continuation-in-part of application No. 14/290,755, filed on May 29, 2014, now Pat. No. 9,992,610.

(60) Provisional application No. 61/847,846, filed on Jul. 18, 2013, provisional application No. 61/832,259, filed on Jun. 7, 2013.

(51) Int. Cl.
*B60Q 9/00* (2006.01)
*H04W 84/12* (2009.01)
*H04W 4/80* (2018.01)
*H04W 76/12* (2018.01)
*F16P 3/14* (2006.01)
*H04W 84/18* (2009.01)

(52) U.S. Cl.
CPC ............ *G08B 21/22* (2013.01); *H04W 76/12* (2018.02); *H04W 84/12* (2013.01); *H04W 84/18* (2013.01)

(58) Field of Classification Search
CPC ........ G08B 21/02; G08B 21/04; G08B 21/24; G08G 1/20; G08G 1/207; G08G 1/163; H04W 84/12; H04W 84/18
USPC ........ 340/540, 551, 686.1, 435, 686.6, 10.1, 340/573.1, 932.2, 539.23, 600, 539.22
See application file for complete search history.

(56) References Cited

U.S. PATENT DOCUMENTS

| | | | | |
|---|---|---|---|---|
| 5,227,764 A * | 7/1993 | Umemoto | .......... | G08B 13/2497 340/426.26 |
| 5,939,986 A * | 8/1999 | Schiffbauer | ........... | B66C 15/045 299/12 |
| 5,942,975 A * | 8/1999 | S.o slashed.rensen | ...................... | B23Q 11/0082 318/478 |
| 6,150,956 A * | 11/2000 | Laufer | .................... | G01S 7/484 340/435 |
| 6,170,607 B1 * | 1/2001 | Freeman | ............... | B66C 15/065 182/18 |
| 6,208,260 B1 * | 3/2001 | West | ........................ | B66C 15/06 340/5.1 |
| 6,288,651 B1 * | 9/2001 | Souza | ..................... | E01F 9/688 200/86 A |
| 6,614,721 B2 * | 9/2003 | Bokhour | ................. | G01S 11/16 340/686.6 |
| 6,778,097 B1 * | 8/2004 | Kajita | ..................... | E02F 3/437 340/12.5 |
| 6,963,278 B2 * | 11/2005 | Frame | ................... | B66C 15/045 340/539.22 |
| 6,965,294 B1 * | 11/2005 | Elliott | ................. | G07C 9/00896 235/382 |
| 7,420,471 B2 * | 9/2008 | Frederick | ................. | E21C 35/24 250/239 |
| 7,437,183 B2 * | 10/2008 | Makinen | ................. | B60R 25/24 340/426.13 |
| 7,847,675 B1 * | 12/2010 | Thyen | ................ | G07G 9/00896 340/5.1 |
| 7,890,235 B2 * | 2/2011 | Self | ......................... | G01S 3/143 340/539.1 |
| 8,319,662 B1 * | 11/2012 | Bontemps | ................ | G08G 1/0955 340/907 |
| 8,446,277 B2 * | 5/2013 | Frederick | ................. | F16P 3/147 340/539.21 |
| 8,606,495 B2 * | 12/2013 | Makela | ................... | E21C 35/08 180/167 |
| 8,768,583 B2 * | 7/2014 | Hargrave, Jr | ........... | E02F 9/262 340/436 |
| 8,773,286 B1 * | 7/2014 | Friend | .................. | G05D 1/0225 340/435 |
| 8,810,390 B2 * | 8/2014 | Frederick | ................ | F16P 3/147 340/539.21 |
| 9,041,546 B2 * | 5/2015 | Pryor | ........................ | E02F 3/16 340/539.13 |
| 9,712,949 B2 * | 7/2017 | Bertosh | ................ | H04W 76/022 |
| 2003/0071739 A1 * | 4/2003 | Addy | ..................... | G08B 13/08 340/686.1 |
| 2003/0102974 A1 * | 6/2003 | Allen | ........................ | G08G 1/20 340/686.6 |
| 2003/0151508 A1 * | 8/2003 | Frame | ................... | B66C 15/045 340/540 |
| 2004/0021568 A1 * | 2/2004 | Seal | ..................... | G01R 22/066 340/551 |
| 2004/0113774 A1 * | 6/2004 | Wilson | ............... | G08B 21/0213 340/539.23 |
| 2004/0217851 A1 * | 11/2004 | Reinhart | ................. | B60Q 9/008 340/435 |
| 2005/0073438 A1 * | 4/2005 | Rodgers | ................. | G08G 1/161 340/944 |
| 2006/0087443 A1 * | 4/2006 | Frederick | ................ | E21C 35/24 340/686.6 |
| 2006/0176160 A1 * | 8/2006 | Zoratti | ..................... | G01S 13/18 340/435 |
| 2006/0238337 A1 * | 10/2006 | Minassian | ............... | G08B 25/10 340/539.23 |
| 2007/0001803 A1 * | 1/2007 | Plamoottil | .......... | G08B 13/1427 340/2.1 |
| 2007/0285305 A1 * | 12/2007 | Tanaka | .................. | G01S 17/936 342/70 |
| 2007/0296565 A1 * | 12/2007 | Himmel | ................ | G01S 13/758 340/435 |
| 2008/0164986 A1 * | 7/2008 | Takafuji | .............. | B60R 21/0136 340/436 |
| 2009/0109049 A1 * | 4/2009 | Frederick | .................. | F16P 3/14 340/686.6 |
| 2009/0140852 A1 * | 6/2009 | Stolarczyk | ............... | H01Q 1/04 340/539.13 |
| 2009/0256715 A1 * | 10/2009 | Frederick | ........... | G08B 21/0213 340/686.6 |
| 2009/0267787 A1 * | 10/2009 | Pryor | .................. | G08B 21/0213 340/686.6 |
| 2010/0114405 A1 * | 5/2010 | Elston | .................. | B66F 9/0755 701/2 |
| 2010/0271214 A1 * | 10/2010 | Frederick | ................ | F16P 3/147 340/600 |
| 2010/0289662 A1 * | 11/2010 | Dasilva | .................... | F16P 3/147 340/686.6 |
| 2011/0050444 A1 * | 3/2011 | Stull | ........................ | G08B 21/22 340/686.6 |
| 2011/0127951 A1 * | 6/2011 | Walley | ..................... | H02J 7/025 320/108 |
| 2011/0133918 A1 * | 6/2011 | Lee | ........................... | B62J 99/00 340/436 |
| 2011/0148581 A1 * | 6/2011 | Chamseddine | ....... | G06K 7/0008 340/10.1 |
| 2011/0163877 A1 * | 7/2011 | Nebot | ...................... | G08G 1/207 340/540 |
| 2011/0249118 A1 * | 10/2011 | Bruno | ............... | B60W 30/0953 348/148 |
| 2011/0260847 A1 * | 10/2011 | Leppanen | ............... | B66C 15/06 340/435 |
| 2011/0298579 A1 * | 12/2011 | Hardegger | ................ | F16P 3/14 340/3.1 |
| 2012/0001734 A1 * | 1/2012 | Gerber | ............... | H04B 10/1143 340/10.1 |
| 2012/0025964 A1 * | 2/2012 | Beggs | .................. | B60Q 1/2673 340/435 |
| 2012/0055726 A1 * | 3/2012 | Hannon | ................. | H04K 3/415 180/272 |
| 2012/0098653 A1 * | 4/2012 | Slack | ..................... | B60Q 9/008 340/435 |
| 2012/0218211 A1 * | 8/2012 | McRae | ................... | G06F 1/1656 345/173 |
| 2013/0015976 A1 * | 1/2013 | Chang | .................. | A61B 5/0002 340/573.7 |

(56) References Cited

U.S. PATENT DOCUMENTS

| | | | |
|---|---|---|---|
| 2013/0061003 A1* | 3/2013 | Millet | G06F 13/4022 711/141 |
| 2013/0088593 A1* | 4/2013 | Ishimoto | E02F 9/226 348/143 |
| 2013/0127638 A1* | 5/2013 | Harrison | G08G 1/166 340/903 |
| 2014/0077961 A1* | 3/2014 | Frederick | G08B 13/1427 340/686.6 |
| 2014/0266759 A1* | 9/2014 | Pryor | E02F 3/16 340/686.6 |
| 2014/0266785 A1* | 9/2014 | Miller | H04W 76/023 340/870.04 |
| 2014/0306814 A1* | 10/2014 | Ricci | H04W 4/21 340/425.5 |
| 2014/0333747 A1* | 11/2014 | Mader | G06K 9/00845 348/78 |
| 2014/0361903 A1* | 12/2014 | Sawada | G01V 15/00 340/686.6 |
| 2014/0369334 A1* | 12/2014 | Bertosh | F16P 3/145 370/338 |
| 2015/0091716 A1* | 4/2015 | Hathaway | B60Q 1/525 340/435 |
| 2015/0177003 A1* | 6/2015 | Ho | H04W 4/02 701/408 |
| 2015/0203081 A1* | 7/2015 | Paulson | B60T 7/22 701/70 |
| 2015/0285906 A1* | 10/2015 | Hooper | G01S 7/412 342/21 |
| 2015/0317897 A1* | 11/2015 | Frederick | G08B 21/22 340/686.6 |
| 2015/0375947 A1* | 12/2015 | Hochstein | B60Q 9/002 348/143 |
| 2016/0003938 A1* | 1/2016 | Gazit | G01S 13/02 342/81 |
| 2016/0061935 A1* | 3/2016 | McCloskey | G01S 7/023 342/82 |
| 2016/0097651 A1* | 4/2016 | Jung | B60K 37/06 701/428 |
| 2016/0152211 A1* | 6/2016 | Owens | B60R 25/102 348/36 |
| 2016/0176338 A1* | 6/2016 | Husted | E02F 9/261 340/435 |

* cited by examiner

METHOD AND APPARATUS FOR PROTECTING A MINER

CROSS-REFERENCE TO RELATED APPLICATIONS

This application is divisional of U.S. patent application Ser. No. 14/325,028 filed Jul. 7, 2014, now U.S. Pat. No. 9,712,949, which is related to provisional application Ser. No. 61/847,846 filed on Jul. 18, 2013, and is a continuation-in-part of U.S. patent application Ser. No. 14/290,755 filed on May 29, 2014, which is a nonprovisional of U.S. provisional patent application Ser. No. 61/832,259 filed on Jun. 7, 2013, all of which are incorporated by reference herein.

FIELD OF THE INVENTION

The present invention is related to a proximity sensing portion which can be remotely controlled through a telecommunications network. More specifically, the present invention is related to a proximity sensing portion which can be remotely controlled through a telecommunications network, such as Wi-Fi, to change the magnetic fields or to reprogram the proximity sensing portion.

BACKGROUND OF THE INVENTION

Proximity sensing portions found in mines have an explosion-proof housing that protects them from damage. In order to access the components of the proximity sensing portion to, for instance reprogram microprocessors inside the proximity sensing portion or change the magnetic field sizes produced by the proximity sensing portion with a potentiometer, the explosion-proof housing has to be opened. To open the explosion-proof housing is a tedious, manually intensive and time-consuming task that could easily require 30 or more bolts to be removed, and then subsequently put back in place when closing the explosion-proof housing. The present invention eliminates the need to have to open the explosion-proof housing to access the proximity sensing portion for common functions such as data collection, changing the magnetic field sizes and reprogramming the microcomputers in the proximity sensing portion; and further even allowing these operations to be performed remotely from the proximity sensing portion.

BRIEF SUMMARY OF THE INVENTION

The present invention pertains to an apparatus for protecting a miner from injury by a machine. The apparatus comprises an explosion-proof housing. The apparatus comprises a proximity sensing portion disposed in the explosion-proof housing having a magnetic field source which produces a magnetic field that is used to sense a location of the miner relative to the machine. The apparatus comprises a wireless communication portion disposed in the explosion-proof housing through which the magnetic field produced by the magnetic field source is changed remotely and wirelessly from outside the explosion-proof housing. The wireless communication portion is in electrical communication with the proximity sensing portion.

The present invention pertains to a method for protecting a miner from injury by a machine. The method comprises the steps of placing a proximity sensing portion with the machine. There is the step of moving the machine in the mine. There is the step of changing remotely and wirelessly from outside an explosion-proof housing of the proximity sensing portion through a wireless communication portion disposed in the explosion-proof housing a magnetic field produced by a magnetic field source of a proximity sensing portion disposed in the explosion-proof housing of the proximity sensing portion, the magnetic field is used to sense a location of the miner relative to the machine, the wireless communication portion in electrical communication with the proximity sensing portion.

The present invention pertains to a system for protecting a miner from injury, as shown in FIG. 6. The system comprises an apparatus having a proximity sensing portion that can have its magnetic field changed remotely through a telecommunications network. The apparatus is described above. The system comprises a machine with the apparatus. The system comprises a personal alarm device worn by the miner for alerting the miner when the miner is within a predetermined distance, i.e. 2-10 feet of the machine. The system comprises a wireless communication network in communication with the wireless communication portion. The system comprises a controller remote from the apparatus in communication with the network through which the controller remotely and wirelessly communicates with the apparatus to change the magnetic field produced by the magnetic field source. The controller has a wireless communication portion, such as a wire module.

DETAILED DESCRIPTION OF THE INVENTION

Figure 1:
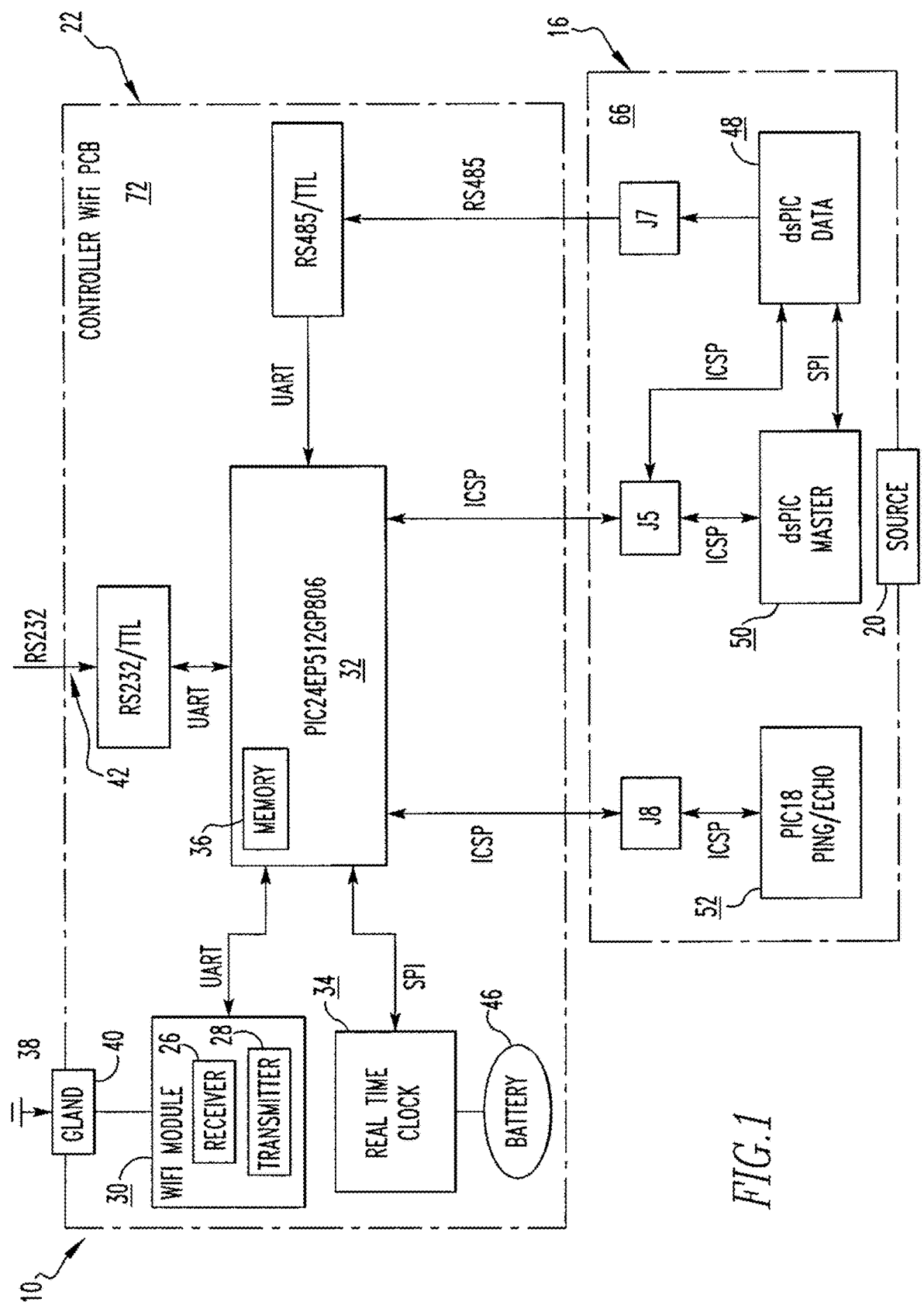
FIG. 1 is a block diagram of an apparatus of the present invention.
Figure 2:
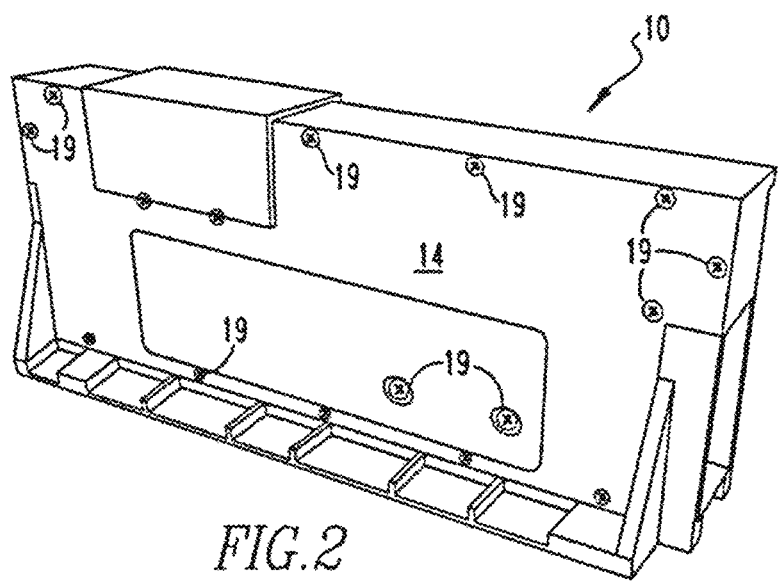
FIG. 2 is a representation of the apparatus.
Figure 5:
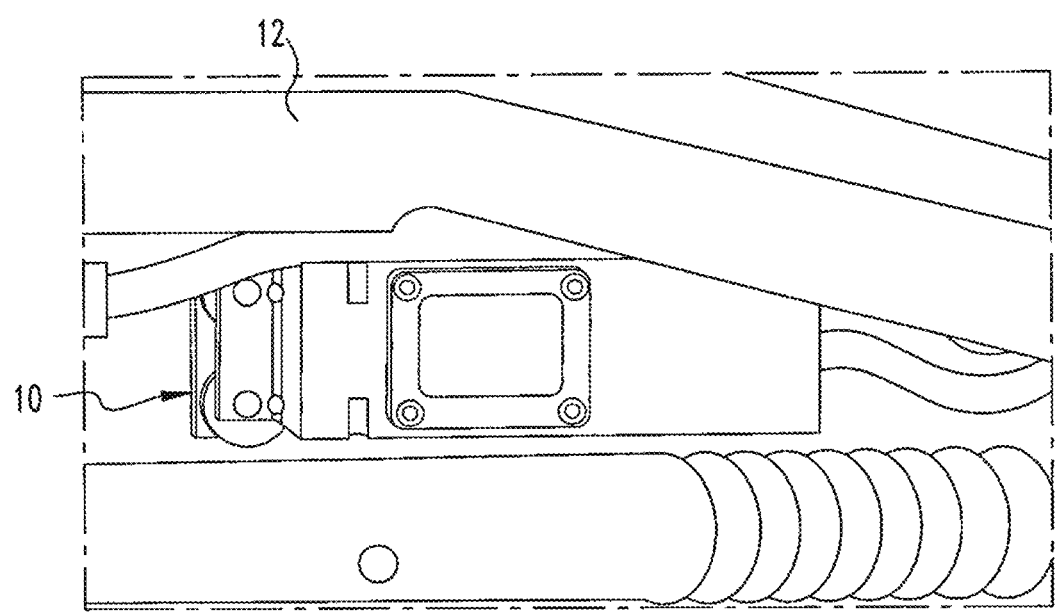
FIG. 5 is a representation of the apparatus on a machine.

Referring now to the drawings wherein like reference numerals refer to similar or identical parts throughout the several views, and more specifically to FIGS. 1, 2 and 5 thereof, there is shown an apparatus 10 for protecting a miner from injury by a machine 12. The apparatus 10 comprises an explosion-proof housing 14. The apparatus 10 comprises a proximity sensing portion 16 disposed in the explosion-proof housing 14 having a magnetic field source 20 which produces a magnetic field that is used to sense a location of the miner relative to the machine 12. The apparatus 10 comprises a wireless communication portion 22 disposed in the explosion-proof housing 14 through which the magnetic field produced by the magnetic field source 20 is changed remotely and wirelessly from outside the explosion-proof housing 14. The wireless communication portion 22 is in electrical communication with the proximity sensing portion 16. Bolts 19 maintain the housing 18 sealed and closed.

The proximity sensing portion 16 may include at least a first microprocessor 24, and the first microprocessor 24 is reprogrammed remotely and wirelessly from outside the explosion-proof housing 14 through the wireless communication portion 22. The wireless communication portion 22 may include a receiver 26 through which signals to change the magnetic field are received wirelessly. The wireless communication portion 22 may include a transmitter 28 from which transmission signals are sent wirelessly from the explosion-proof housing 14.

The wireless communication portion 22 may include a Wi-Fi module 30 having the transmitter 28 and the receiver 26. The wireless communication portion 22 may include a Wi-Fi microprocessor 32 in electrical communication with the Wi-Fi module 30. The wireless communication portion 22 may include a real-time clock 34 in electrical communication with the Wi-Fi microprocessor 32 which provides a timestamp for data received by the Wi-Fi microprocessor 32 and stored in a memory 36 of the Wi-Fi microprocessor 32. The wireless communication portion 22 may include an antenna 38, and the explosion-proof housing 14 includes a gland 40 through which the antenna 38 extends from the explosion-proof housing 14. The wireless communication portion 22 may include a cable port 42 through which the Wi-Fi module 30 is reprogrammed when the Wi-Fi module 30 is not working properly. An example of a mine Wi-Fi system is described in U.S. patent application Ser. No. 14/290,755, incorporated by reference herein. An example of a safety system for mining equipment that is based on a proximity sensing portion 16 is described in U.S. Pat. No. 7,420,471, incorporated by reference herein.

The present invention pertains to a method for protecting a miner from injury by a machine 12. The method comprises the steps of placing a proximity sensing portion 16 with the machine 12. There is the step of moving the machine 12 in the mine. There is the step of changing remotely and wirelessly from outside an explosion-proof housing 14 through a wireless communication portion 22 disposed in the explosion-proof housing 14 a magnetic field produced by a magnetic field source 20 of the proximity sensing portion 16 disposed in the explosion-proof housing 14 of the proximity sensing portion 16. The magnetic field is used to sense a location of the miner relative to the machine 12. The wireless communication portion 22 in electrical communication with the proximity sensing portion 16.

There may be the step of reprogramming a first microprocessor 24 of the proximity sensing portion 16 remotely and wirelessly from outside the explosion-proof housing 14 through the wireless communication portion 22. There may be the step of receiving wirelessly through a receiver 26 of the wireless communication portion 22 signals to change the magnetic field. There may be the step of transmitting wirelessly from the explosion-proof housing 14 with a transmitter 28 of the wireless communication portion 22 housing 14 transmission signals. The wireless communication portion 22 may include a Wi-Fi module 30 having the transmitter 28 and the receiver 26.

The wireless communication portion 22 may include a Wi-Fi microprocessor 32 in electrical communication with the Wi-Fi module 30. The wireless communication portion 22 may include a real-time clock 34 in electrical communication with the Wi-Fi microprocessor 32, and there may be the step of providing a timestamp for data received by the Wi-Fi microprocessor 32 and stored in a memory 36 of the Wi-Fi microprocessor 32. The wireless communication portion 22 may include an antenna 38, and the explosion-proof housing 14 may include a gland 40 through which the antenna 38 extends from the explosion-proof housing 14. The wireless communication portion 22 may include a cable port 42, and there may be the step of reprogramming the Wi-Fi module 30 through the cable port 42 when the Wi-Fi module 30 is not working properly.

In the operation of the invention, an apparatus 10 having a proximity sensing portion 16 with Wi-Fi capability is able to transmit data as well as receive signals to reprogram and change the field sizes of the proximity sensing portion 16. With reference to FIG. 1, an antenna 38 extends from the explosion-proof housing 14 of the proximity sensing portion 16 through an MSHA approved gland 40 that protects the components inside the explosion-proof housing 14 from the mine environment. The antenna 38 extends from the explosion-proof housing 14 and is electrically connected with a Wi-Fi module 30 disposed inside the explosion-proof housing 14. The Wi-Fi module 30 is, for instance, miniWi-Fi01 or part number 1W-SM2128M1-C available for purchase from ConnectionOne in San Jose, Calif. This Wi-Fi module 30 has the necessary transmitter and receiver functionality required to support the operation described herein.

Data from the data microprocessor 48 in the explosion-proof housing 14 is sent to an interface, a J7 header of the proximity sensing portion 16. From the J7 header, the data is sent to a location where voltage signals are converted, an RS485/TTL which is connected to the J7 header through a serial connection, an RS485 connection. The data is then sent from the RS485TTL over a serial connection, a universally asynchronous receiver/transmitter (UART) connection to a Wi-Fi microprocessor 32 that receives the data and stores the data in a memory 36. The memory 36 in the Wi-Fi microprocessor 32 could store the data for a month if desired. The data which is stored in the memory 36 of the Wi-Fi microprocessor is also given a timestamp. The timestamp is attained by the Wi-Fi microprocessor 32 requesting a timestamp from a real-time clock 34 over an SPI connection through which the Wi-Fi microprocessor 32 is connected to the real-time clock 34. A battery 46 dedicated to the real-time clock 34 is connected to the real-time clock 34 to support the real-time clock 34 as needed. This battery 46 could last for many years. The time stamped data is provided from the Wi-Fi microprocessor 32 to the Wi-Fi module 30 through a UART connection. The time stamped data is then transmitted from the Wi-Fi module 30 and out the explosion-proof housing 14 through the antenna 38.

To reprogram the field sizes of the proximity sensing portion 16, the reprogramming signals are received by the antenna 38 and provided to the Wi-Fi module 30. From the Wi-Fi module 30 through the UART connection, the signals are provided to the Wi-Fi microprocessor 32. From the Wi-Fi microprocessor 32, the reprogramming signals are provided to an interface, a J5 header through a programming line, an ICSP connection. From the J5 header, the reprogramming signals are provided to the data microprocessor 48. The data microprocessor 48 recognizes the reprogramming signals and provides those reprogramming signals through an SPI connection to a master microprocessor 50 of the proximity sensing portion 16. The reprogramming signals provided to the master microprocessor 50 from the data microprocessor 48 are the same as what existed in standard proximity sensing portions. The reprogramming signals from the data microprocessor 48 basically are the same signals as would be provided to the master microprocessor 50 if a potentiometer was used, as was common in the past, to change the field sizes. In a preferred embodiment, the controller Wi-Fi board 72 described herein is disposed in and connected with the proximity controller board 66 of the HazardAvert proximity module, incorporated by reference herein, sold by Strata Safety Products, Sandy Springs, Ga. This module is waterproof, armored and explosion-proof.

The ping/echo microprocessor 52, master microprocessor 50, data microprocessor 48 and J8, J5 and J7 headers (interfaces) are part of an existing proximity sensing portion 16 controller board 66 that already exists in proximity sensing portions 16. The Wi-Fi capability is essentially matched to communicate with the existing proximity controller board 66 so minimal changes are made to the proximity controller board 66 and the components thereon. The changes are software or functional in nature to the proximity controller board 66 to allow the data microprocessor 48 to recognize the signals that are received from the Wi-Fi module 30, or which are sent to the Wi-Fi module 30. The Wi-Fi capability provided by the components of the controller Wi-Fi board 72 essentially mimic the signals that existed in prior art proximity sensing portions 16 that used manual connectivity to receive signals from or provide signals to the proximity controller board 66 after the explosion-proofhousing 14 was opened.

If there is a problem with the Wi-Fi module 30, access to the Wi-Fi module 30 for reprogramming or diagnostic purposes is attained through a location where voltage signals are converted, an RS232/TL from a serial connection, an RS232 line. The RS232TL is accessed by opening the explosion-proof housing 14, as had been done in the past to change the field sizes. The Wi-Fi module 30, real-time clock 34, battery 46, RS485/TTL and RS232/TTL are all part of the controller Wi-Fi board 72 that is inserted into the explosion-proof housing 14 and connected with the proximity controller board 66.

Each of the microprocessors of the proximity controller board 66 is able to be reprogrammed through Wi-Fi. The ping/echo microprocessor 52 has a bidirectional ICSP connection with the J8 header and the J8 header has a bidirectional ICSP connection with the Wi-Fi microprocessor 32. The master and the data microprocessors of the proximity controller board 66 each have a ICSP bidirectional connection with the J5 header, and the J5 header has a bidirectional ICSP connection with the Wi-Fi microprocessor 32. As mentioned above, the Wi-Fi microprocessor 32 has a bidirectional UART connection with the Wi-Fi module that is in communication through the antenna 38 with the external world to receive and send wireless signals.

Whenever any or each of the microprocessors on the proximity controller board 66 are desired to be reprogrammed, code is received by the antenna 38 and provided to the Wi-Fi module 30 and then to the Wi-Fi microprocessor 32. If the code is to reprogram the ping/echo microprocessor 52, the code is provided through the J8 header to the ping/echo microprocessor 52. If the code is to reprogram the master microprocessor 50 or the data microprocessor 48, the code is provided from the Wi-Fi microprocessor 32 to the J5 header and then to either the master or the data microprocessor. The connections are bidirectional so that the entire code in each of the microprocessors on the proximity controller board 66 are able to be reviewed and read, as desired, and as needed, wirelessly from a remote location through the Wi-Fi module.

1. How the magnetic fields are changed:

There are 2 methods:

A. Magnetic fields changed via socket connection.

Using software written for this purpose, the user connects to the proximity Wi-Fi module 30 using either an adhoc or infrastructure Wi-Fi network connection. Adhoc mode is used when the connection is point to point between the PC running the software and the apparatus 10 itself. Infrastructure mode is used when the Wi-Fi board 72 has been established on an existing Wi-Fi network. Once the connection is made, the program establishes a socket connection with the proximity Wi-Fi module 30. The user of the software can then query or set the magnetic field values as a percentage. To set a field, the software sends a special command over this socket connection to the Wi-Fi module 30. The Wi-Fi microprocessor 32 on the Wi-Fi board 72 periodically queries a parameter change flag on the Wi-Fi module 30. When it sees that this value has changed, it then queries the Wi-Fi module 30 for all possible parameter changes. (All field settings, Code load, etc.). The Wi-Fi microprocessor 32 takes the new field value and then converts it from a percentage to the actual value used by the data microprocessor 48. The Wi-Fi microprocessor 32 then puts the data microprocessor 48 into programming mode, reads the field values already stored in the data microprocessor's EEPROM and updates those values with the new setting. The Wi-Fi microprocessor 32 also sets a 'new field values' flag in the Data microprocessor's EEPROM that the data microprocessor 48 checks when it starts up. The Wi-Fi microprocessor 32 releases the data microprocessor 48 from programming mode. Once the data microprocessor 48 has been released from programming mode, it restarts. At start up, it checks its eeprom for the 'new field values' flag. Seeing that the flag is set, it sends over the new field value indicated by the flag to the master microprocessor 50 to let the master microprocessor 50 know that there is a new field generator value for a particular generator of the source 20. The master microprocessor 50 then performs a voltage calibration for that generator. At this point the generator field value has been changed.

B. Magnetic fields changed via web page parameters

This works the same as above except that the field value is changed from a web page that can be accessed from any web enabled device (iPhone, PC, etc.). The value is changed by accessing a web page hosted by the Wi-Fi board's web server of the Wi-Fi module 30.

2. How new firmware is uploaded.

Code load is initiated by special PC code upload software. Using software written for this purpose, the user connects to the proximity Wi-Fi module 30 using either an adhoc or infrastructure Wi-Fi network connection. Adhoc mode is used when the connection is point to point between the PC running the software and the apparatus 10 itself. Infrastructure mode is used when the Wi-Fi board 72 has been established on an existing Wi-Fi network. Once the connection is made, the program establishes a socket connection with the proximity Wi-Fi module 30. The PC program sends a command to the Wi-Fi module 30 to let the Wi-Fi microprocessor 32 know that a programming session is requested. This command contains information telling which microprocessor to program (data, master or P/E) and the size of the new image. If the size is within appropriate boundaries, the Wi-Fi microprocessor 32 acknowledges the request. The PC program then sends over the image to be programmed in a standard Intel hex file format. The Wi-Fi microprocessor 32 receives this new image and saves it to internal flash memory 36. (This means that the Wi-Fi microprocessor 32 will have a copy of image in its memory 36 even through power cycles; the Wi-Fi microprocessor 32 could reprogrammed at a future point without having a new image sent via Wi-Fi). The Wi-Fi microprocessor 32 converts this hex file stored in flash memory 36 into three binary images in RAM that matches the Wi-Fi microprocessor's three memory spaces (flash, EEPROM and config bytes). The Wi-Fi microprocessor 32 puts the proximity sensing portion 16 microprocessor to be programmed into program mode by setting the MCLR line high (12 v). Each memory 36 area is program via ICSP (In Circuit Serial Programming). Once a memory 36 area has been programmed, it is read back and compared to the image in RAM to verify that the programming is successful. While this is going on the Wi-Fi microprocessor 32 is sending messages back to the PC indicated the current state and status of the programming session. Once the programming has completed, the Wi-Fi module 30 will send a message back to the PC indicating success and will then close the socket connection.

tion with the network 74 through which the controller 80 remotely and wirelessly communicates with the apparatus 10 to change the magnetic field produced by the magnetic field source 20. The controller has a wireless communication portion, such as a wire module.

Strata Proximity Wi-Fi

| Item | Qty | Reference | Part | Description | Vendor | Digikey | PCB Footprint |
|---|---|---|---|---|---|---|---|
| 1 | 1 | J5 | 43650-0301 | CONN 3 POS RECEPTACLE | MOLEX | WM1866-ND | |
| 2 | 1 | J7 | 534998-6 | 6X2 FEMALE HEADER | TE CONNECTIVITY | A26487-ND | |
| 3 | 1 | J8 | 43650-0201 | CONN 2 RECEPTACLE | MOLEX | WM1865-ND | |
| 4 | 1 | U1 | PIC24EP512GP806-E/PT | MICROPROCESSOR 16-BIT 512 KB FLASH | MICROCHIP | PIC24EP512GP806-I/PT | 64-TQFP |

Examples of mine equipment on which the proximity sensing portion 16 is used is the following:
Continuous miner
Shuttle car
Haulage system
Highwall miner
Load-haul-dump
Conveyor belt
Forklift
Front-end loader
Haul truck The proximity detection system for the mining industry works by establishing a magnetic marker field—or zone—around machinery using the proximity sensing portion 16, also known as the generator (or proximity module depending on the mining type). One or more of the apparatus 10 may be fitted onto machinery to create fields designated as the 'WARNING ZONE' and 'DANGER ZONE.' This marker field can encompass the entire machine 12 and its turning radius, or be specific to certain areas.

Figure 4:
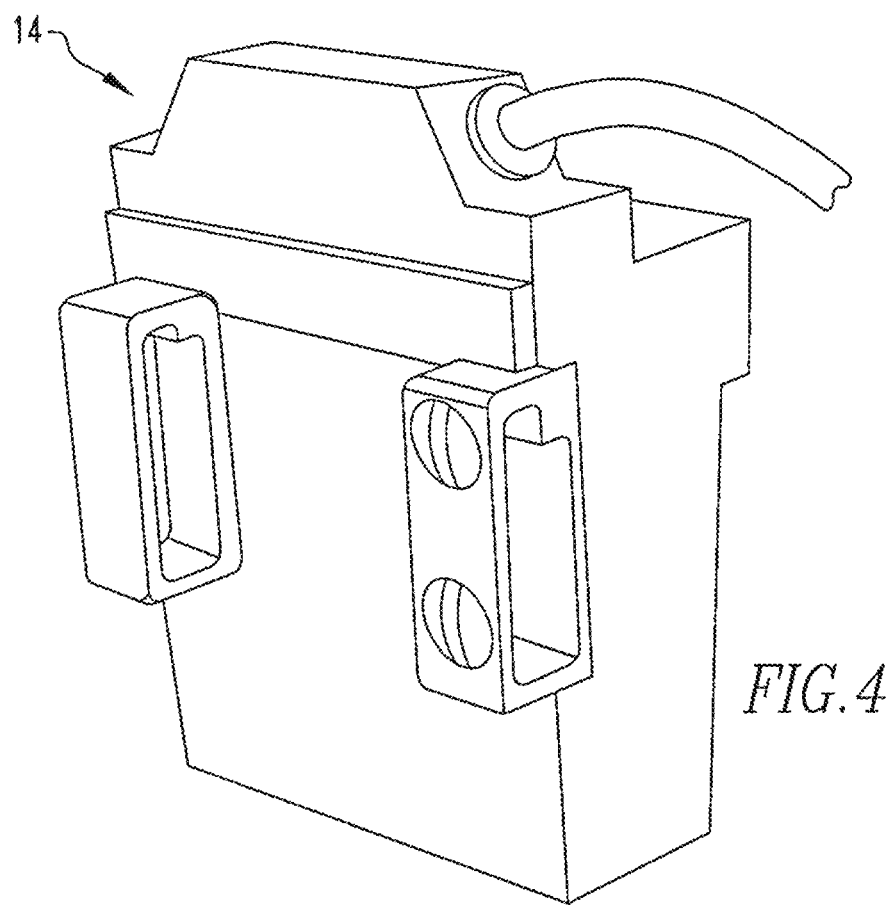
FIG. 4 is a representation of a PAD.

Miners wear a Personal-Alarm Device (PAD) 44, as shown in FIG. 4, which detects and measures the magnetic marker field to determine their proximity to the machine 12, and alert them of possible danger to their safety. The PAD 44 attaches to the miners belt and has an optional clip-on 'warning module' that attaches to the hardhat.

Visible and audible alarms for miner and machine 12 operator

As the miner enters the warning zone around the machinery, visual and audible alarms alert both the miner and the machine 12 operator. If the miner enters the danger-zone, a product, such as HazardAvert sold by Strata Worldwide LLC of Georgia, can be programmed to shut the machine 12 off completely.

Figure 3:
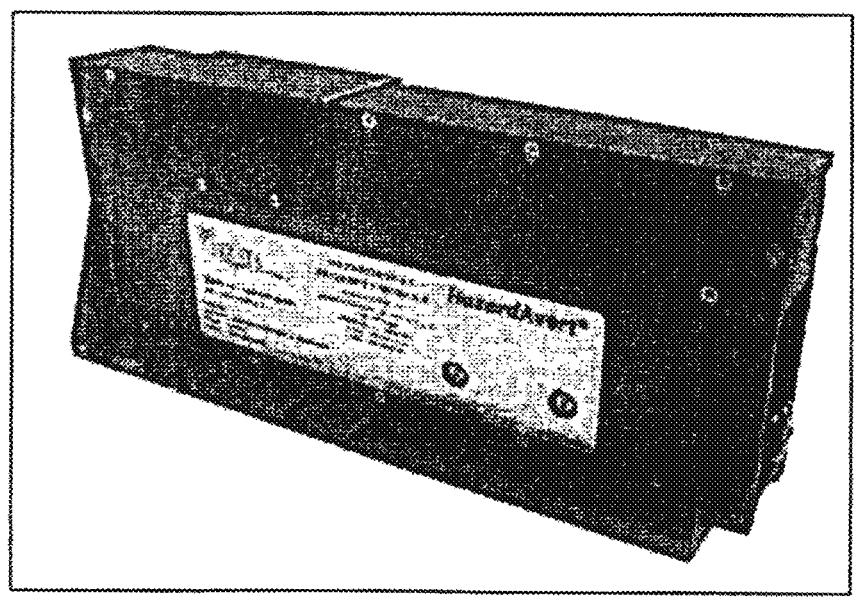
FIG. 3 is a computer-generated drawing of the apparatus.
Figure 6:
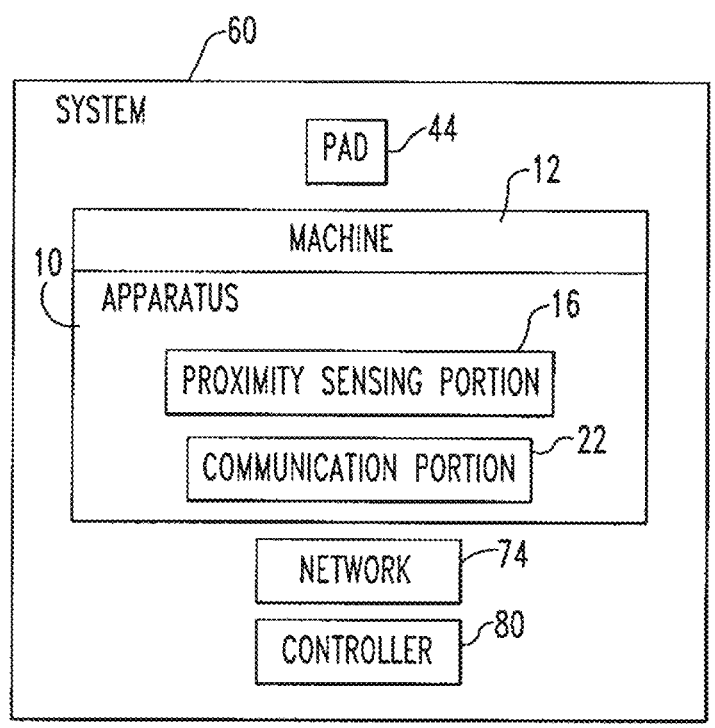
FIG. 6 is a block diagram of a system of the present invention.

The present invention pertains to a system 60 for protecting a miner from injury, as shown in FIG. 6. The system 60 comprises an apparatus 10 having a proximity sensing portion 16 that can have its magnetic field changed remotely through a telecommunications network 74. The apparatus 10 is described above. The system comprises a machine 12 with the apparatus 10. The system comprises a personal alarm device 44 worn by the miner for alerting the miner when the miner is within a predetermined distance, i.e. 2-10 feet of the machine 12. The system 60 comprises a wireless communication network 74 in communication with the wireless communication portion 16. The system 60 comprises a controller 80 remote from the apparatus 10 in communica- FIGS. 2 and 3 show the apparatus 10 with a proximity sensing portion 16, otherwise known as a field generator, for hard-rock and surface mining. FIG. 5 shows a field generator for coal mining on a machine 12. FIG. 4 shows an MSHA approved PAD 44 for coal mining.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An apparatus for protecting a person from injury by a machine comprising:
   an explosion proof housing;
   a proximity sensing portion disposed in the housing having a field source which produces a field that is used to sense a location of the person relative to the machine; and
   a wireless communication portion disposed in the housing through which the field produced by the field source is changed remotely and wirelessly from outside the housing based on signals wirelessly received to reprogram and change the field, the wireless communication portion in electrical communication with the proximity sensing portion, the proximity sensing portion includes at least a first microprocessor having code, and the first microprocessor is reprogrammed remotely and wirelessly from outside the housing through the wireless communication portion and the code is able to be read remotely and wirelessly from outside the housing through the wireless communication portion.

2. The apparatus of claim 1, wherein the wireless communication portion includes a receiver through which signals to change the field are received wirelessly.

3. The apparatus of claim 2 wherein the wireless communication portion includes a transmitter from which transmission signals are sent wirelessly from the housing.

4. The apparatus of claim 3 wherein the wireless communication portion includes a Wi-Fi module having the transmitter and the receiver.

5. The apparatus of claim 4 wherein the wireless communication portion includes a Wi-Fi microprocessor in electrical communication with the Wi-Fi module.

6. The apparatus of claim 5 wherein the wireless communication portion includes a real-time clock in electrical communication with the Wi-Fi microprocessor which provides a timestamp for data received by the Wi-Fi microprocessor and stored in a memory of the Wi-Fi microprocessor.

7. The apparatus of claim 6 wherein the wireless communication portion includes an antenna and the housing includes a gland through which the antenna extends from the housing.

8. The apparatus of claim 7 wherein the wireless communication portion includes a cable port through which the Wi-Fi module is reprogrammed when the Wi-Fi module is not working properly.

9. A method for protecting a person from injury by a machine comprising the steps of:
   placing a proximity sensing portion disposed in an explosion proof housing with the machine;
   moving the machine;
   changing remotely and wirelessly from outside the housing through a wireless communication portion disposed in the housing a field produced by a field source of the proximity sensing portion disposed in the housing based on signals wirelessly received to reprogram and change the field, the field is used to sense a location of the person relative to the machine, the wireless communication portion in electrical communication with the proximity sensing portion; and
   reprogramming a first microprocessor having code of the proximity sensing portion remotely and wirelessly from outside the housing through the wireless communication portion and wherein the code is able to be read remotely and wirelessly from outside the housing through the wireless communication portion.

10. The method of claim 9 including the step of receiving wirelessly through a receiver of the wireless communication portion signals to change the field.

11. The method of claim 10 including the step of transmitting wirelessly from the housing with a transmitter of the wireless communication portion housing transmission signals.

12. The method of claim 11 wherein the wireless communication portion includes a Wi-Fi module having the transmitter and the receiver.

13. The method of claim 12 wherein the wireless communication portion includes a Wi-Fi microprocessor in electrical communication with the Wi-Fi module.

14. The method of claim 13 wherein the wireless communication portion includes a real-time clock in electrical communication with the Wi-Fi microprocessor, and including the step of providing a timestamp for data received by the Wi-Fi microprocessor and stored in a memory of the Wi-Fi microprocessor.

15. The method of claim 14 wherein the wireless communication portion includes an antenna and the housing includes a gland through which the antenna extends from the housing.

16. The method of claim 15 wherein the wireless communication portion includes a cable port, and including the step of reprogramming the Wi-Fi module through the cable port when the Wi-Fi module is not working properly.

17. A system for protecting a person from injury by a machine comprising:
   an apparatus having an explosion proof housing;
   a proximity sensing portion disposed in the housing having a field source which produces a field that is used to sense a location of the person relative to the machine;
   a wireless communication portion disposed in the housing through which the field produced by the field source is changed remotely and wirelessly from outside the housing based on signals wirelessly received to reprogram and change the field, the wireless communication portion in electrical communication with the proximity sensing portion disposed on the machine and a personal-alarm device which engages with the field to trigger an alarm disposed on the person;
   a wireless communication network in communication with the wireless communication portion; and
   a controller remote from the apparatus in communication with the network through which the controller remotely and wirelessly communicates with the apparatus to change the field produced by the field source.

18. An apparatus for protecting a person from injury by a machine comprising:
   a housing;
   a proximity sensing portion disposed in the housing having a field source which produces a field that is used to sense a location of the person relative to the machine; and
   a wireless communication portion disposed in the housing through which the field produced by the field source is changed remotely and wirelessly from outside the housing based on signals wirelessly received to reprogram and change the field, the wireless communication portion in electrical communication with the proximity sensing portion, the wireless communication portion includes a Wi-Fi module having a transmitter and a receiver, the wireless communication portion includes a cable port through which the Wi-Fi module is reprogrammed when the Wi-Fi module is not working properly.

* * * * *